(12) United States Patent
Hozono

(10) Patent No.: US 8,218,204 B2
(45) Date of Patent: Jul. 10, 2012

(54) IMAGE READING APPARATUS AND IMAGE FORMING APPARATUS PROVIDED WITH SUCH AN IMAGE READING APPARATUS

(75) Inventor: Tomohide Hozono, Osaka (JP)

(73) Assignee: Kyocera Mita Corporation (JP)

( * ) Notice: Subject to any disclaimer, the term of this patent is extended or adjusted under 35 U.S.C. 154(b) by 480 days.

(21) Appl. No.: 12/623,031

(22) Filed: Nov. 20, 2009

(65) Prior Publication Data

US 2010/0128328 A1    May 27, 2010

(51) Int. Cl.
*H04N 1/04* (2006.01)
*G06F 15/00* (2006.01)
*B65H 33/04* (2006.01)
*F16D 1/00* (2006.01)

(52) U.S. Cl. ...... 358/474; 358/497; 358/1.3; 270/58.12; 474/144

(58) Field of Classification Search .................. 358/474, 358/497, 1.3; 270/58.12; 474/144
See application file for complete search history.

(56) References Cited

U.S. PATENT DOCUMENTS

2007/0146817 A1    6/2007    Osakabe

FOREIGN PATENT DOCUMENTS

| JP | 5-145705 | 6/1993 |
| JP | 8107475 | 4/1996 |
| JP | 10336405 | 12/1998 |
| JP | 2003-158614 | 5/2003 |
| JP | 2007-178506 | 7/2007 |

*Primary Examiner* — Charlotte M Baker
*Assistant Examiner* — Rury Grisham
(74) *Attorney, Agent, or Firm* — Gerald E. Hespos; Michael J. Porco

(57) ABSTRACT

An image reading apparatus is provided with a carriage accommodating an optical unit for image reading, a driving member for moving the carriage, a guide rail, a guide-rail engaging portion engaged with the guide rail, a holding portion for holding the driving member, a guide plate and a claw portion. The claw portion presses the guide-rail engaging portion against the guide rail by partially deforming the driving member to produce a tensile force in the driving member and causing the tensile force to act on the first end portion of the carriage, and produces such a rotation moment for biasing the first end portion of the carriage in a first direction parallel with a sub scanning direction and, on the other hand, biasing the second end portion of the carriage in a second direction opposite to the first direction and parallel with the sub scanning direction.

13 Claims, 14 Drawing Sheets

MAIN SCANNING DIRECTION

SUB SCANNING DIRECTION

IMAGE READING APPARATUS AND IMAGE FORMING APPARATUS PROVIDED WITH SUCH AN IMAGE READING APPARATUS

BACKGROUND OF THE INVENTION

1. Field of the Invention

The present invention relates to an image reading apparatus for optically reading a document image and an image forming apparatus provided with such an image reading apparatus such as a copier, a facsimile machine or a complex machine of these.

2. Description of the Related Art

Generally, an image forming apparatus such as a copier optically reads a document image using an image reading apparatus and prints a sheet-like recording material such as a copier sheet based on read image data or transmits the read image data to a receiving-side facsimile machine via a communication tool.

The image reading apparatus irradiates a document with light from a light source in a carriage which moves in a sub scanning direction orthogonal to a main scanning direction of a document placed on a transparent platen. A beam of light reflected by the document is introduced in a specified direction by a mirror accommodated in the carriage, then focused by a lens and incident on a CCD (image sensor) arranged at a focus position to be read as image data.

In such an image reading apparatus, the carriage is slid in the sub scanning direction along a round bar-like guide rail. Here, due to vibration, a variation of sliding resistance or the like produced upon moving the carriage, the carriage may possibly swing by as much as a fitting clearance with the guide rail. In this case, since a read image is distorted, it becomes difficult to accurately and stably read an image.

Conventionally, several techniques have been proposed to prevent or suppress such a swinging movement. However, these techniques are accompanied by complicated structures, causing a new problem of leading to a product cost escalation of the image reading apparatus.

SUMMARY OF THE INVENTION

An object of the present invention is to enable a swinging movement of a carriage to be prevented without leading to a product price escalation caused by a complicated structure.

In order to accomplish this object, one aspect of the present invention is directed to an image reading apparatus for optically reading a document, including a carriage including a first end portion and a second end portion facing each other in a main scanning direction of the document and accommodating an optical unit for image reading: a driving member mounted on a plurality of pulleys for moving the carriage in a sub scanning direction orthogonal to the main scanning direction of the document; a guide rail extending in the sub scanning direction; a guide-rail engaging portion provided on the first end portion of the carriage and engaged with the guide rail; a holding portion provided on the first end portion of the carriage for holding the driving member; a guide plate for supporting the carriage by being held in sliding contact with the lower surface of the second end portion of the carriage and guiding a movement of the carriage in the sub scanning direction; and a claw portion for pressing the guide-rail engaging portion against the guide rail by partially deforming the driving member to produce a tensile force in the driving member and causing the tensile force to act on the first end portion of the carriage, and producing such a rotation moment for biasing the first end portion of the carriage in a first direction parallel with the sub scanning direction and, on the other hand, biasing the second end portion of the carriage in a second direction opposite to the first direction and parallel with the sub scanning direction.

Further, another aspect of the present invention is directed to an image forming apparatus, including an image reading apparatus for optically reading an image and an image forming unit for forming an image on a recording material based on image data read by the image reading apparatus, wherein this image reading apparatus has the above construction.

BRIEF DESCRIPTION OF THE DRAWINGS

FIGS. 14A and 14B are diagrams showing an image reading apparatus according to a first comparative example, wherein FIG. 14A is a front view showing an essential part of the image reading apparatus and FIG. 14B is a bottom view showing the essential part, FIGS. 16A and 16B are diagrams showing an image reading apparatus according to a third comparative example, wherein FIG. 16A shows a state before document scanning by the image reading apparatus and FIG. 16B shows a state during document scanning.

DETAILED DESCRIPTION OF THE PREFERRED EMBODIMENTS

Hereinafter, embodiments of the present invention are described with reference to the drawings.

(Schematic Construction of an Image Forming Apparatus)

Figure 1:
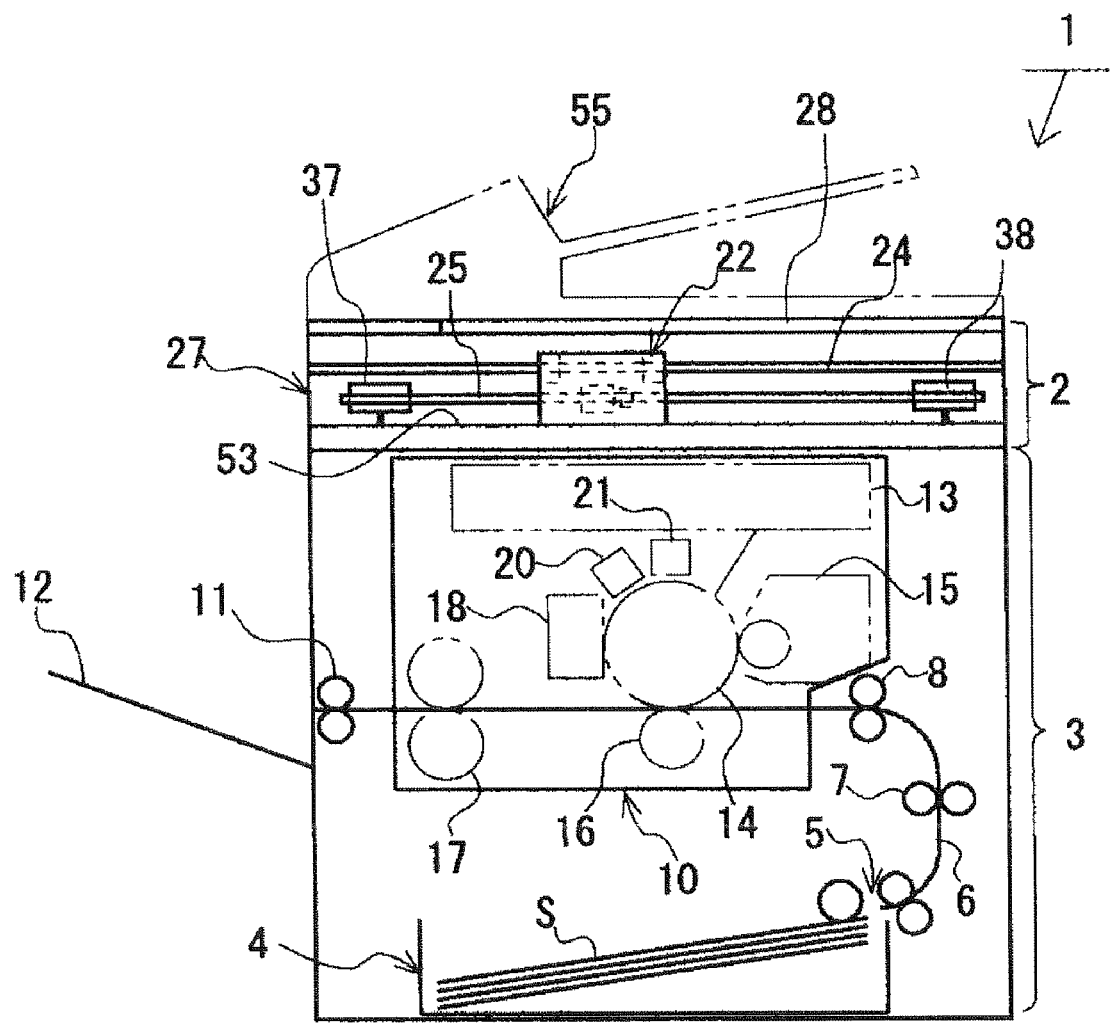
FIG. 1 is a schematic construction diagram of an image forming apparatus according to one embodiment of the invention.

FIG. 1 is a schematic construction diagram showing an image forming apparatus 1. The image forming apparatus 1 is provided with an image reading apparatus (scanner assembly) 2 for reading a document image, and a printer assembly 3 for printing a sheet-like recording material (copy sheet, plastic film, etc.) S based on image data read by the image reading apparatus 2 or transmitted from an external apparatus (facsimile machine, personal computer, scanner, etc.).
(Printer Assembly)

The printing assembly 3 of the image forming apparatus 1 includes a sheet cassette 4 for accommodating a plurality of recording materials S, a recording material conveyance path 6, and a printing unit (image forming unit) 10 for forming an image on the recording material S based on image data read by the image reading apparatus 2.

One of the plurality of recording materials S in the sheet cassette 4 is fed to the recording material conveyance path 6 by a feeding mechanism 5. The recording material S fed to the recording material conveyance path 6 is conveyed to a pair of registration rollers 8 along the recording material conveyance path 6 by a pair of conveyor rollers 7. By pressing the leading end of the recording material S against a nip of the registration roller pair 8, an oblique posture of the recording material S is corrected. The registration roller pair 8 feeds the recording material S to the printing unit 10 in accordance with a print timing, and an image is printed on the recording material S by the printing unit 10. The printed recording material S is discharged onto a discharge tray 12 by a pair of discharge rollers 11. Here, the printing unit 10 may be either of the electrophotographic type or of the ink jet type.

If the printing unit 10 is of the electrophotographic type, it includes an exposure device 13, a photoconductive member 14, a developing device 15, a transfer device 16 and a fixing device 17. The exposure device 13 forms an electrostatic latent image on the photoconductive member 14 based on image data read by the image reading apparatus 2. This electrostatic latent image is developed into a toner image by the developing device 15. The toner image on the photoconductive member 14 is transferred to the recording material S by the transfer device 16, and the toner image transferred to the recording material S is fixed in the fixing device 17.

A cleaning device 18 for removing the toner remaining on the photoconductive member 14 after the image transfer, a neutralizing device 20 for electrically neutralizing the surface of the photoconductive member 14 having the toner removed by the cleaning device 18, and a charging device 21 for uniformly charging the surface of the photoconductive member 14 electrically neutralized by the neutralizing device 20 are successively arranged around the photoconductive member 14 of FIG. 1 in a clockwise direction.

If the printing unit 10 is of the ink jet type, it includes a discharge mechanism (not shown) for discharging ink in an unillustrated ink tank toward the recording material S. The operation of this discharge mechanism is controlled based on image data read by the image reading apparatus 2 and an image is printed on the recording material S with ink particles discharged from a nozzle of the discharge mechanism.
(Description of Image Reading Apparatuses According to Comparative Examples of the Invention)

Figure 13:
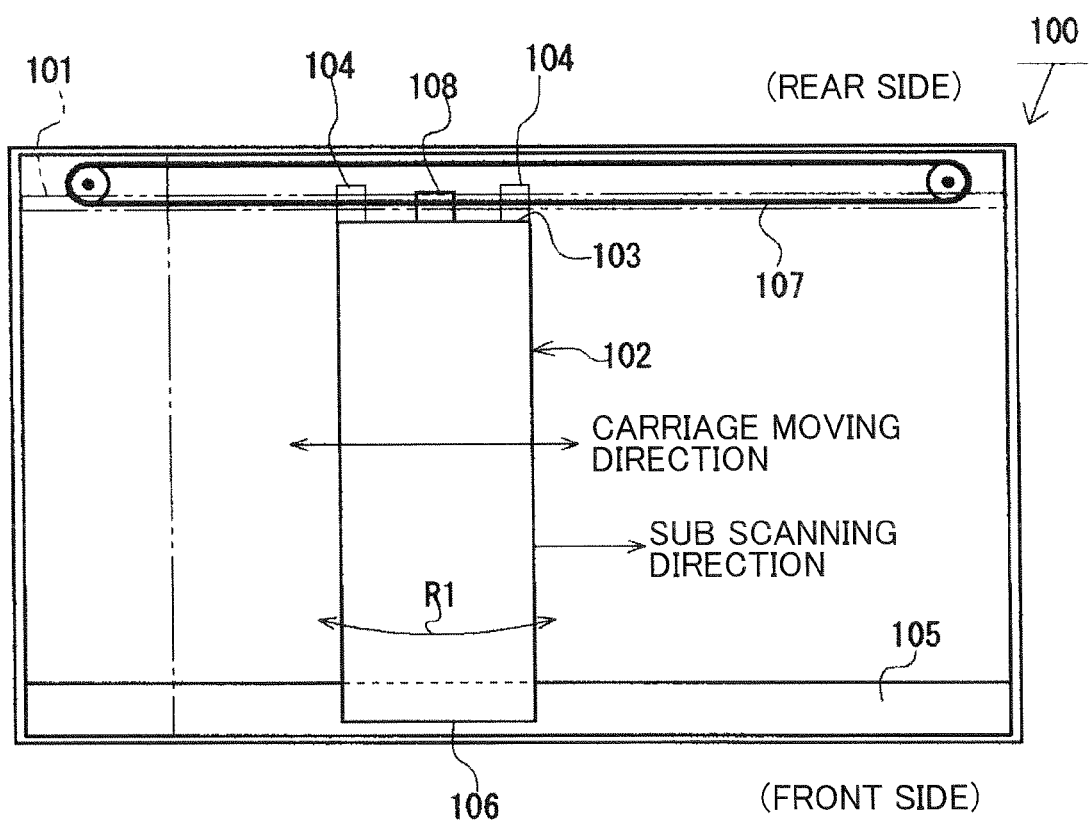
FIG. 13 is a plan view diagrammatically showing an image reading apparatus according to a comparative example of the invention.

Before describing the image reading apparatus 2 according to the embodiment of the present invention, image reading apparatuses according to comparative examples of the present invention are described. FIG. 13 is a plan view diagrammatically showing an image reading apparatus 100 according to a comparative example.

This image reading apparatus 100 is structured such that bearings 104 provided on one end portion 103 of a carriage 102 in a main scanning direction are slidably engaged with a round bar-like guide rail 101 extending in a sub scanning direction. On the other hand, an other end portion 106 of the carriage 102 in the main scanning direction is slidably placed on a guide plate 105 extending in the sub scanning direction. A belt holding portion (holding portion) on the one end portion 103 of the carriage 107 is fixed to a driving belt (timing belt/driving member) 107 which is an endless toothed belt mounted in such a manner as to move in the sub scanning direction. By turning the driving belt 107, the carriage 102 is moved along the guide rail 101.

However, since the carriage 102 is slid relative to the round bar-like guide rail 101 in such an image reading apparatus 100, fitting clearances are provided between the guide rail 101 and the bearings 104. Thus, the carriage 102 swings by as much as the fitting clearances between the guide rail 101 and the bearings 104 due to vibration, a variation of sliding resistance or the like produced upon moving the carriage 102 in the sub scanning direction. Such swinging movements are rotational movements of the carriage 102 in forward and reverse directions shown by arrows R1 in the plan view of FIG. 13. Such swinging movements distort a read image, making it difficult to accurately and stably read the image.

Figure 14A:
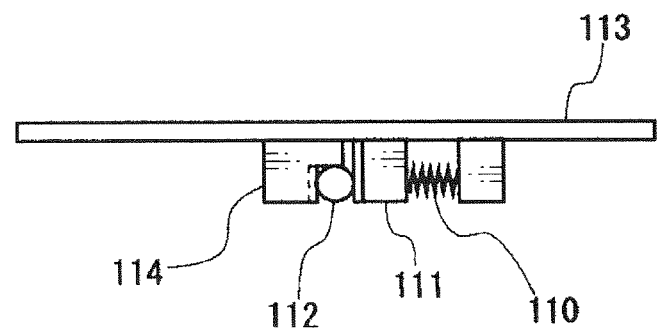
Figure 14B:
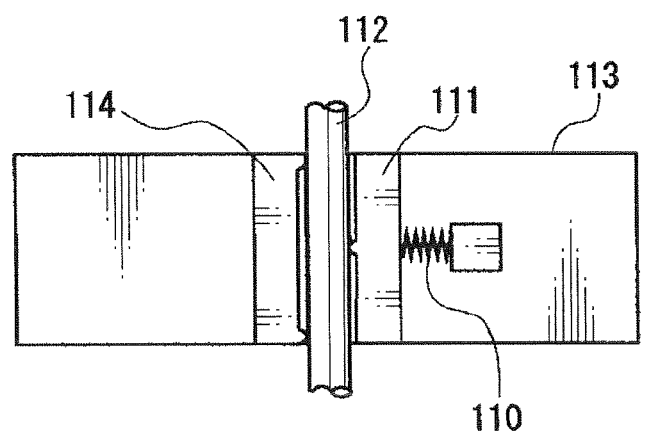

In order to solve such a problem, there is a construction according to a first comparative example shown in FIGS. 14A, 14B. The first comparative example is structured such that a guide rail 112 is pressed against a fixed sliding member 114 of a carriage 113 by a pressing sliding member 111 biased by a spring 110. The guide rail 112 is so tightly held between the fixed sliding member 114 and the pressing sliding member 111 as to be slidable. This solves a backlash between the carriage 113 and the guide rail 112 and swinging movements of the carriage 113 due to such a backlash.

Figure 15:
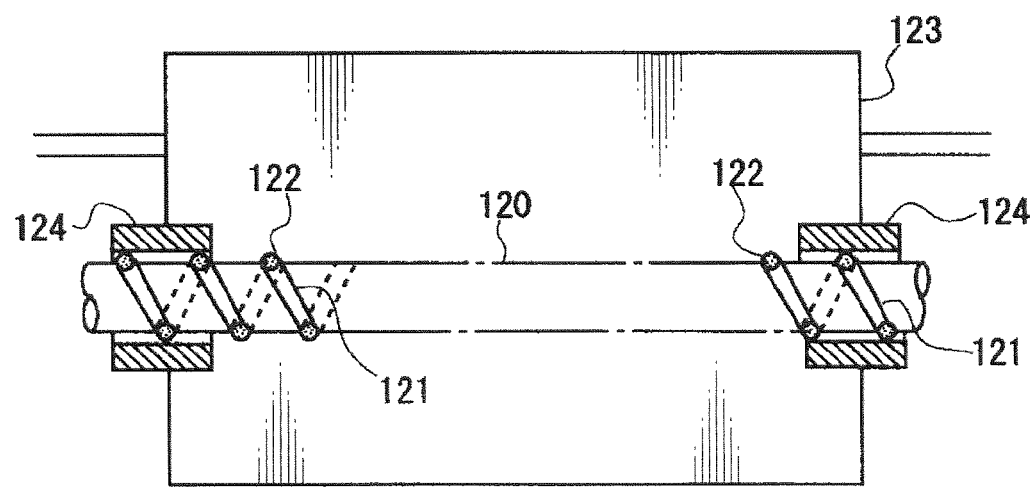
FIG. 15 is a diagram showing an image reading apparatus according to a second comparative example.

A second comparative example shown in FIG. 15 is structured such that a spiral groove 121 is formed in the outer circumferential surface of a guide shaft 120 and a coil spring 122 is engaged in this spiral groove 121. By compressing this coil spring 122 by the inner circumferential surfaces of bearings 124 of a carriage 123, fitting clearances between the guide shaft 120 and the bearings 124 of the carriage 123 are eliminated. In this way, vibration produced upon the movement of the carriage 123 is reduced.

Figure 16A:
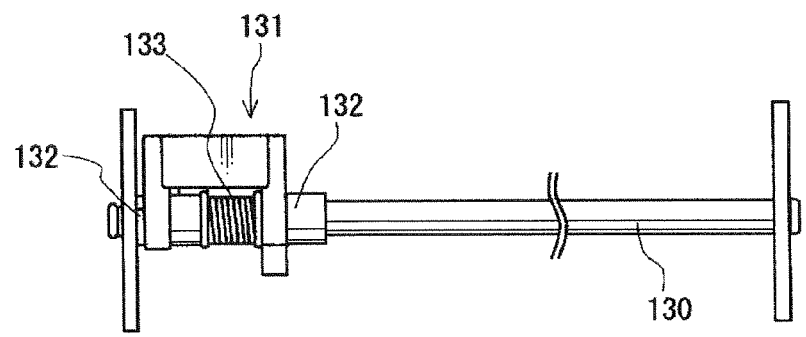
Figure 16B:
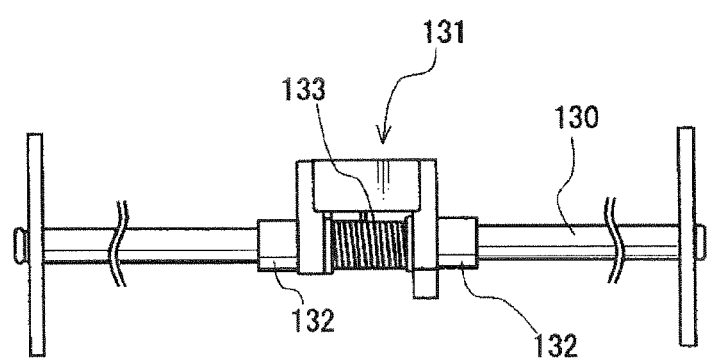

A third comparative example shown in FIGS. 16A, 16B is structured such that a distance between a pair of bearings 132 of a carriage 131 engaged with a guide rail 130 is narrowed at a home position (see FIG. 16A) and the pair of bearings 132 of the carriage 131 are pushed wider apart by the force of a spring 133 during document scanning (image reading) (see FIG. 16B) in order to avoid the enlargement of the entire apparatus. This reduces a swinging movement amount of the carriage 131 due to fitting clearances between the bearings 132 and the guide rail 130.

However, any of the techniques shown in FIGS. 14A to 16B complicates the structure to prevent or suppress swinging movements of the carriage 113, 123 or 131, thereby causing a new problem of leading to a product price escalation of the image reading apparatus.

Figure 2:
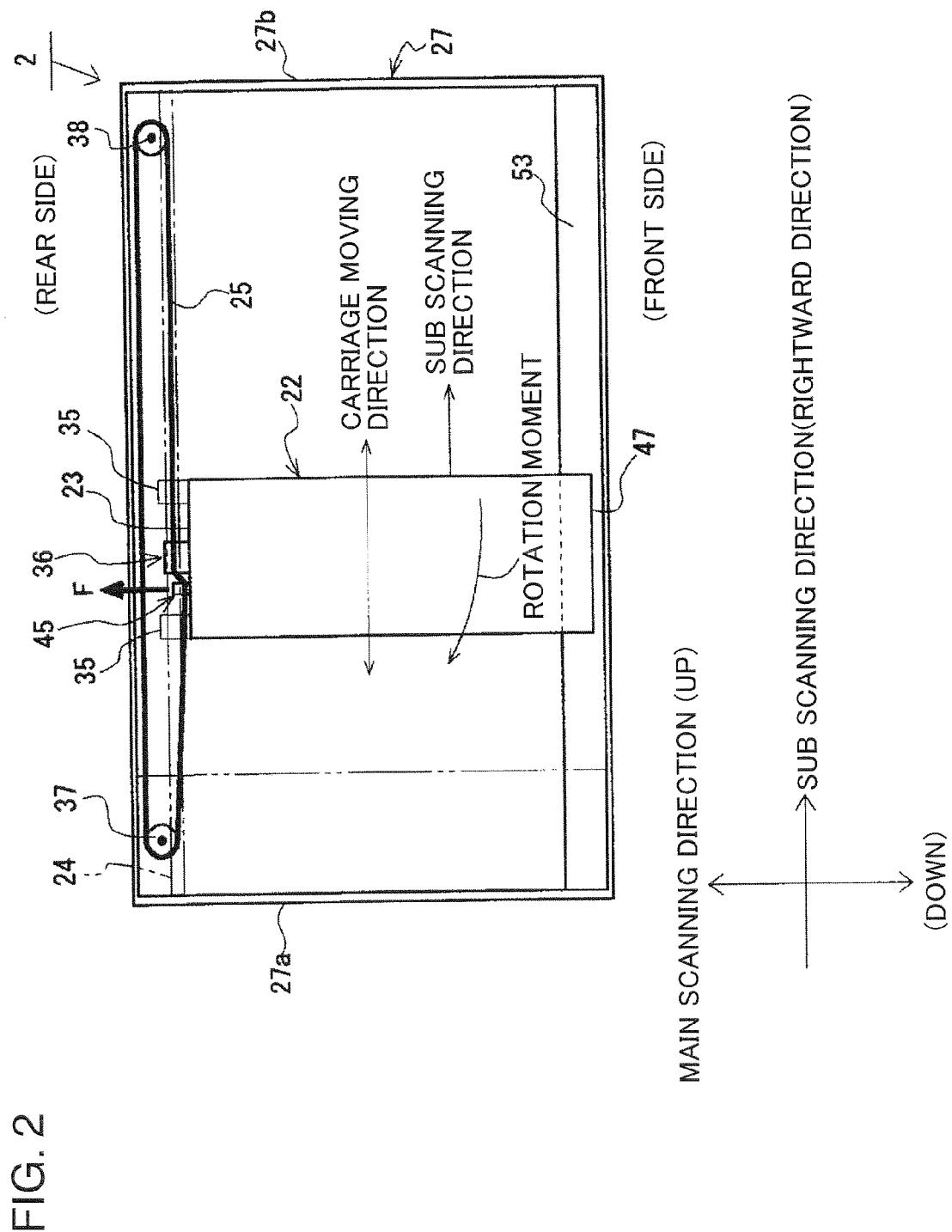
FIG. 2 is a plan view diagrammatically showing a first embodiment of an image reading apparatus.
Figure 6:
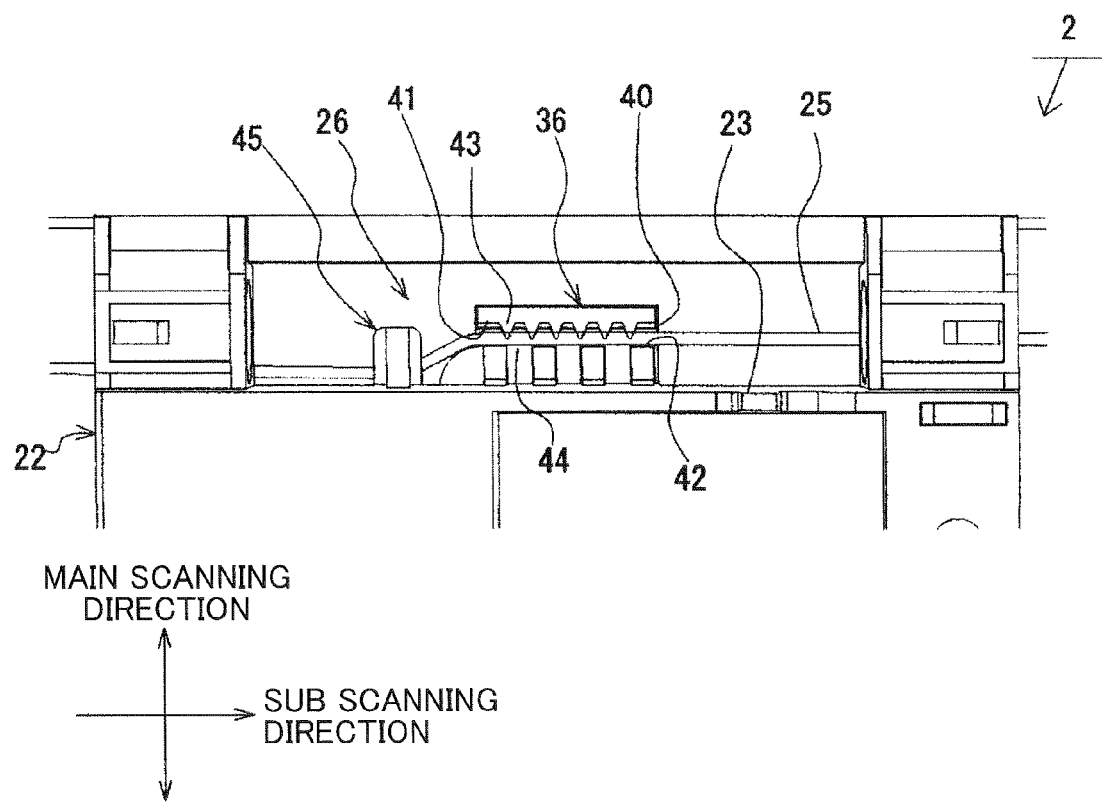
FIG. 6 is a plan view of the one end portion of the carriage.
Figure 7:
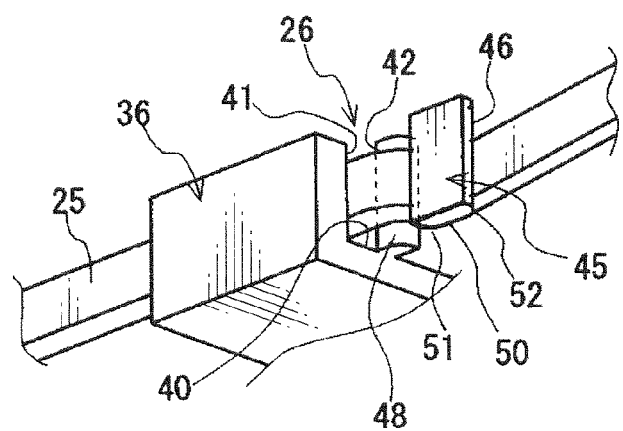
FIG. 7 is a perspective view showing an engaged part of the carriage and a driving belt when viewed obliquely from below.

First Embodiment of the Image Reading Apparatus According to the Embodiment of the Present Invention A first embodiment of the image reading apparatus 2 shown in FIG. 1 is described below with reference to FIGS. 1 to 7. FIG. 2 is a plan view diagrammatically showing the image reading apparatus 2, FIG. 3 is a structural view diagrammatically showing a carriage 22 cut along a moving direction thereof, FIG. 4 is a perspective view of the carriage 22 when viewed obliquely from above, FIG. 5 is a perspective view showing one end portion 23 of the carriage 22 when viewed in a direction of an arrow A of FIG. 4, FIG. 6 is a plan view showing the one end portion 23 of the carriage 22 with a guide rail 24 removed, and FIG. 7 is a perspective view showing an engaged part 26 of the carriage 22 and a driving belt 25 when viewed obliquely from below.

Figure 3:
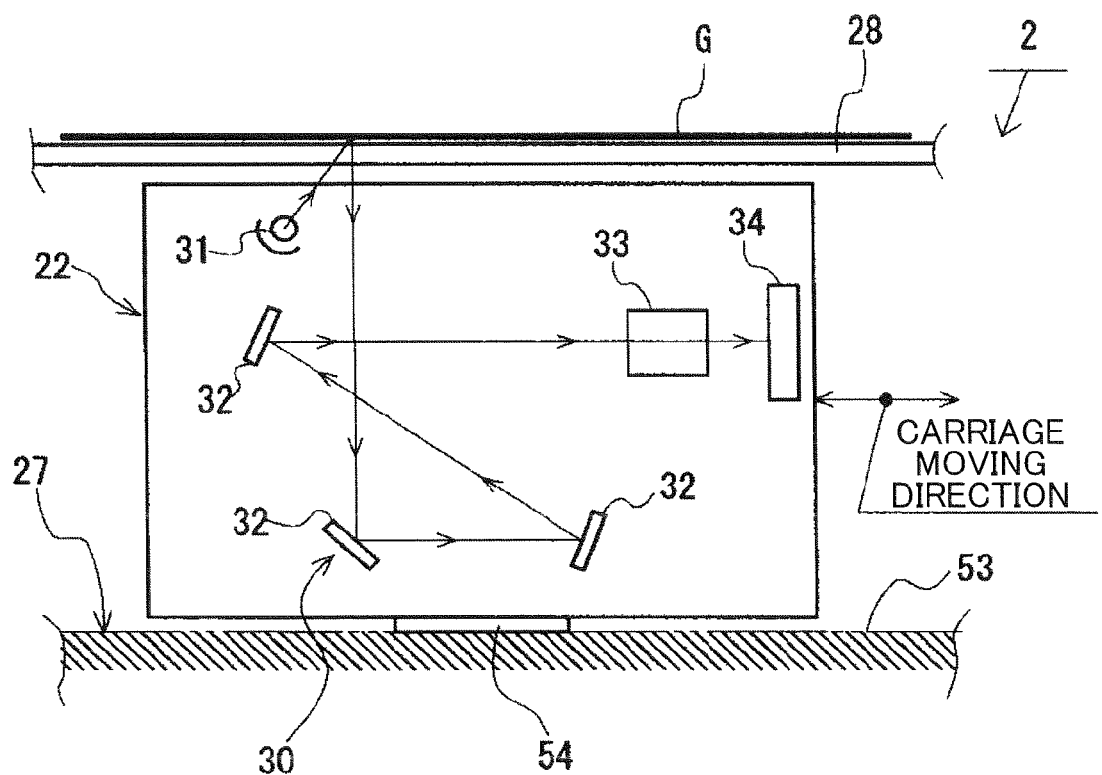
FIG. 3 is a structural view diagrammatically showing a carriage cut along a moving direction thereof.

As shown in FIGS. 1 to 3, the image reading apparatus 2 is such that a rectangular transparent plate 28, on which a document G is to be placed, is mounted atop a box-shaped frame body 27 having a rectangular planar shape. The transparent plate 28 is, for example, a contact glass, a plastic plate or the like. The carriage 22 accommodating an optical unit 30 is so accommodated in the frame body 27 as to be movable in a sub scanning direction (rightward direction of FIG. 2; first direction) from a home position (specified position at the left end in FIG. 2). The carriage 22 is a housing long in a main scanning direction and includes one end portion 23 (first end) and the other end portion 47 (second end) at the opposite ends in the main scanning direction.

The optical unit 30 accommodated in the carriage 22 includes a light source 31 for irradiating the document G with light via the transparent plate 28, a plurality of mirrors 32 for reflecting a beam of light reflected by the document G in a specified direction, a lens 33 for focusing the beam of light reflected by this plurality of mirrors 32 and a CCD (image sensor) 34 for reading data of an image focused by the lens 33. By moving this carriage 22 in the sub scanning direction from the home position, the image of the document G on the transparent plate 28 is optically read by the optical unit 30 in the carriage 22.

Figure 4:
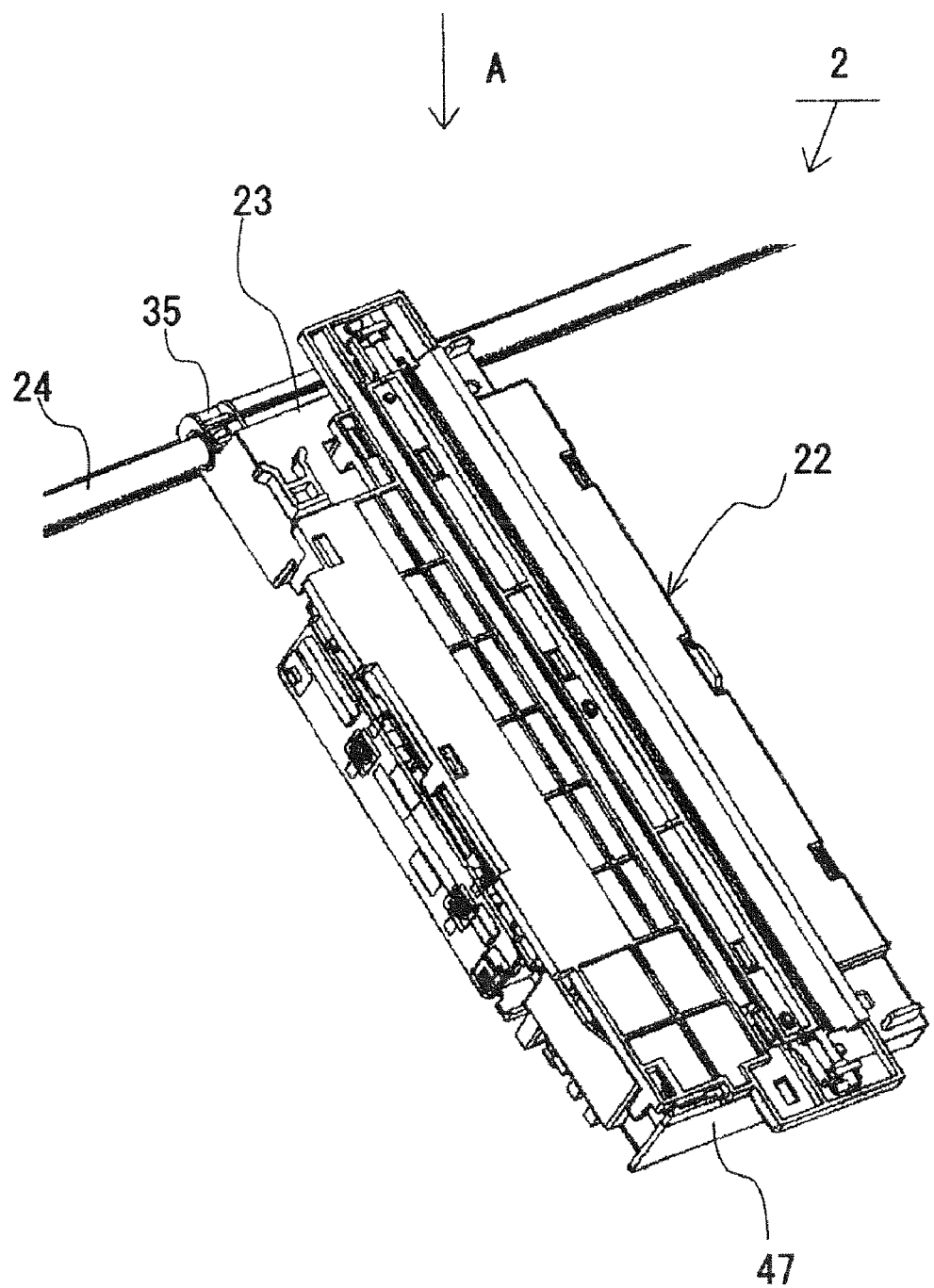
FIG. 4 is a perspective view of the carriage when viewed obliquely from above.
Figure 5:
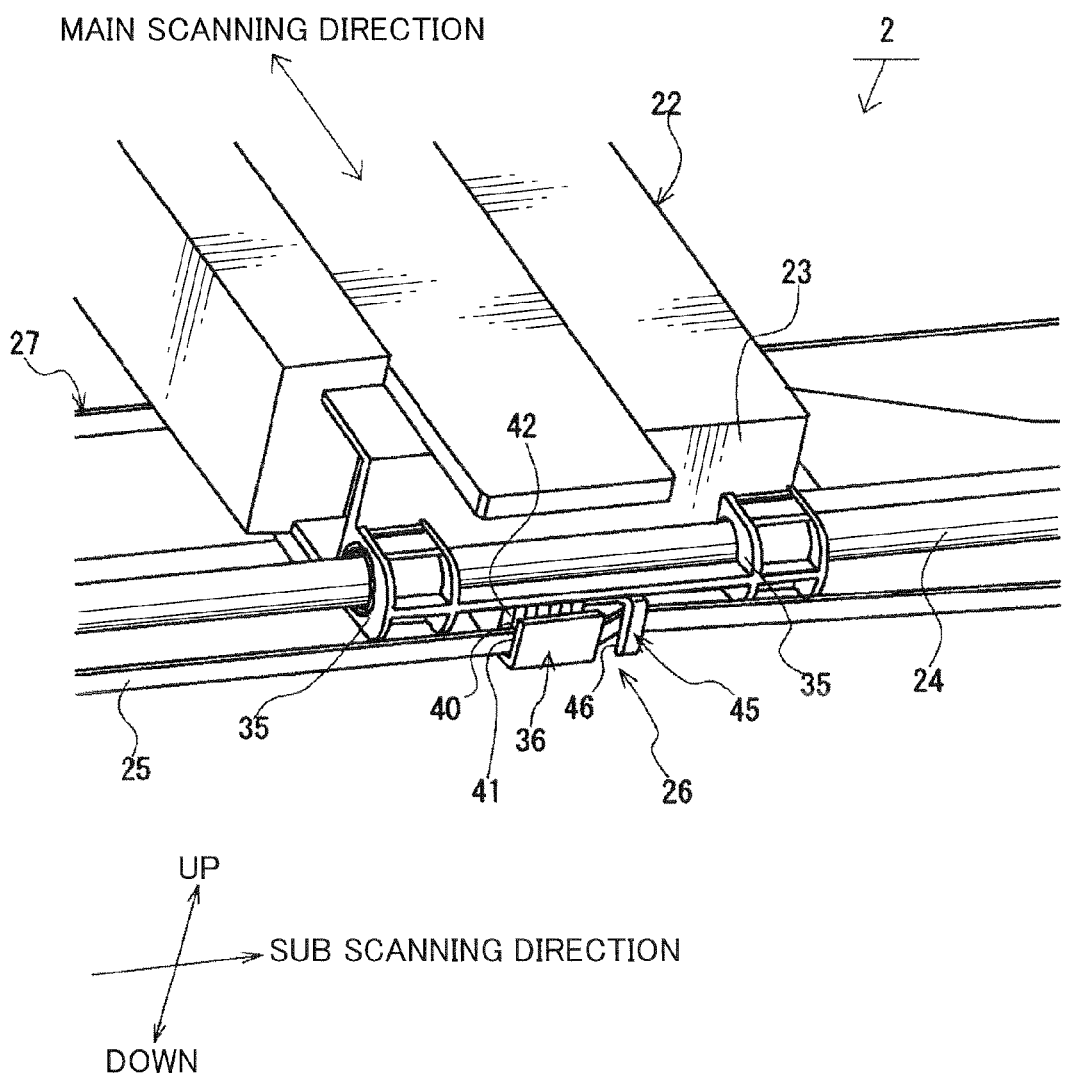
FIG. 5 is a perspective view showing one end portion of the carriage when viewed in a direction of an arrow A of FIG. 4.

As shown in FIGS. 2, 4 and 5, a pair of bearings 35 (guide-rail engaging portions) slidably engageable with the round bar-like guide rail 24 are provided on the one end portion 23 of the carriage 22 in the main scanning direction while being spaced apart in the sub scanning direction. On the one end portion 23, a belt holding portion 36 for holding the driving belt 25 is provided at a position substantially in the center between the pair of bearings 35 and below the pair of bearings 35, i.e. at a position where the driving belt 25 does not interfere with the guide rail 24 and the like.

The guide rail 24 extends from a left wall 27a to a right wall 27b of the frame body 27 in the sub scanning direction as shown by chain double-dashed line in FIG. 2. The inner circumferential surfaces of the bearings 35 of the carriage 22 are fitted on the guide rail 24 while forming small clearances therewith. As shown in FIG. 2, an endless toothed belt is used as the driving belt 25. For example, the toothed belt is formed by embedding a core made of steel, glass fiber, aramide fiber or the like in synthetic rubber or polyurethane. The driving belt 25 is mounted on pulleys 37, 38 arranged at one end portion (upper end in FIG. 2) of the frame body 27 in the main scanning direction and spaced apart at the opposite ends of the frame body 27 in the sub scanning direction. By rotating the pulleys 37, 38 in forward and reverse directions, the driving belt 25 is rotated in forward and reverse directions.

The belt holding portion 36 of the carriage 22 is formed along the sub scanning direction and includes such a groove 40, into which the driving belt 25 is insertable from above. A plurality of projections 43, 44 are formed on side surfaces (opposite side surfaces facing the driving belt 25) forming the groove 40. These plurality of projections 43, 44 tightly hold the driving belt 25 in an elastically deformed (biting) state, whereby the one end portion 23 of the carriage 22 is reliably fixed to the driving belt 25 (see FIGS. 6 and 7). In FIG. 2, the guide rail 24 and the pair of bearings 35 engaged with the guide rail 24 are shown by chain double-dashed line for the sake of convenience.

As shown in FIGS. 2, 5 to 7, a claw portion 45 to be engaged with the driving belt 25 is formed to project at a position (engaging position) at the one end portion 23 of the carriage 22 in the main scanning direction located between the bearing 35 rearward of the belt holding portion 36 in the sub scanning direction and the belt holding portion 36 and displaced inwardly (downwardly in FIG. 2) from the belt holding portion 36 in the main scanning direction. The claw portion 45 produces a tensile force in the driving belt 25 by partly deforming a turning path of the driving belt 25 and causes this tensile force to act on the one end portion 23 of the carriage 22.

This claw portion 45 includes a groove 46, into which the driving belt 25 is insertable from below. By fitting the driving belt 25 into this groove 46, the claw portion 45 is hooked onto the driving belt 25. This hook engagement causes the driving belt 25 to project inwardly (downwardly in FIG. 2 toward the other end portion 47 of the carriage 22 in the main scanning direction) in the main scanning direction which is a direction to increase the tensile force of the driving belt 25, thereby producing a force F, which is acting outwardly in the main scanning direction, in the driving belt 25.

Figure 9:
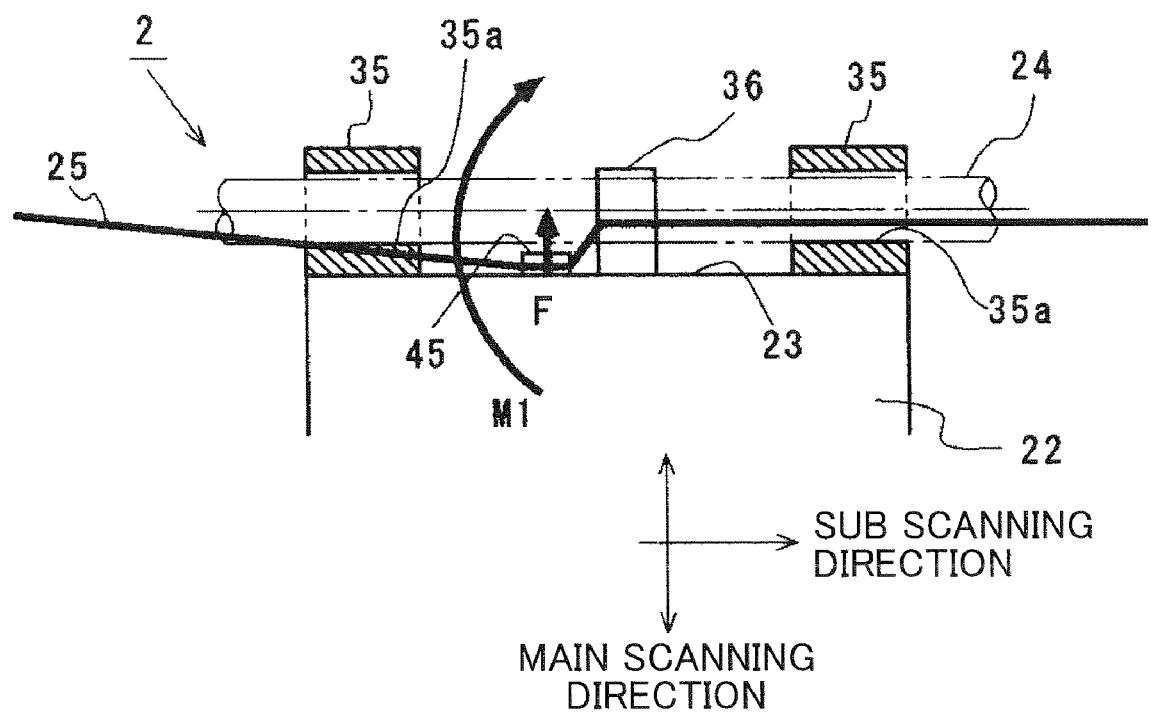
FIG. 9 is a schematic view showing the one end portion of the carriage used to describe the function of the first embodiment.

As a result, the inner circumferential surfaces of the pair of bearings 35 of the carriage 22 are pressed against the guide rail 24 with the force F produced in the driving belt 25 (see FIG. 9). Further, the claw portion 45 is hooked onto the driving belt 25, thereby being able to exert a rotation moment (M1) acting in a clockwise direction of FIG. 2 to the carriage 22 by the tensile force of the driving belt 25 (see FIG. 9). In other words, when the claw portion 45 is hooked onto the driving belt 25, such a rotation moment as to bias the one end portion 23 of the carriage 22 in the sub scanning direction (first direction) and bias the other end portion 47 of the carriage 22 in a direction (second direction) opposite to the sub scanning direction acts on the carriage 22.

As shown in FIG. 7, a side surface 42 of the belt holding portion 36 held in contact with the driving belt 25 and located inwardly in the main scanning direction is formed with an arcuate belt guiding surface 48. Arcuately curved surfaces 51, 52 are respectively formed on the opposite ends of a side surface 50 of the claw portion 45 held in contact with the driving belt 25. Thus, even if the driving belt 25 is engaged with the belt holding portion 36 and the claw portion 45, the driving belt 25 is deformed and smoothly curved, an excessive stress does not act on the driving belt 25 and there is no likelihood of reducing the durability of the driving belt 25.

As shown in FIGS. 2 and 3, the other end portion 47 of the carriage 22 in the main scanning direction is slidably supported by a guide plate 53 arranged at the bottom of the frame body 27 and extending in the sub scanning direction. A sliding member 54 having a lower friction coefficient than the carriage 22 and the guide plate 53 is fixed to the lower surface of the other end portion 47 of the carriage 22. Thus, when the carriage 22 moves, the sliding member 54 of the carriage 22 slides into contact with the guide plate 53, thereby being able to suppress a change of sliding resistance (variation of sliding resistance) caused when the carriage 22 moves.

According to the image reading apparatus 2 of the first embodiment as described above, the inner circumferential surfaces of the pair of bearings 35 come into close contact with the guide rail 24 by the tensile force of the driving belt 25 and the carriage 22 smoothly slides along the guide rail 24 without shaking. Further, even if vibration or a variation of sliding resistance is produced when the carriage 22 moves, a rotation moment (M1) is produced to rotationally bias the carriage 22 in one direction by the tensile force of the driving belt 25, wherefore the posture of the carriage 22 is stable (posture shown in FIG. 9 is held) without causing the carriage 22 to make swinging movements. Therefore, the image reading apparatus 2 of the first embodiment can accurately read the image of the document G.

The image reading apparatus 2 of the first embodiment can prevent the occurrence of swinging movements of the carriage 22 only by hooking the claw portion 45 formed on the carriage 22 onto the driving belt 25. Accordingly, it is not necessary to mount a separate part for preventing swinging movements of the carriage 22 (no increase in the number of parts) and complicate the apparatus structure, wherefore there is no product price escalation.

In the image forming apparatus 1 including the image reading apparatus 2 of the first embodiment, the printer assembly 3 can accurately print the recording material S based on precisely read image data.

The image reading apparatus 2 of the first embodiment may also be such that an automatic document feeder (ADF) 55 is installed to automatically feed a document to a reading position on the transparent plate 28 as shown in FIG. 1. In this case, the carriage 22 moves from the home position to the reading position and reads an image at rest at the reading position.

Second Embodiment of the Image Reading Apparatus

Figure 8:
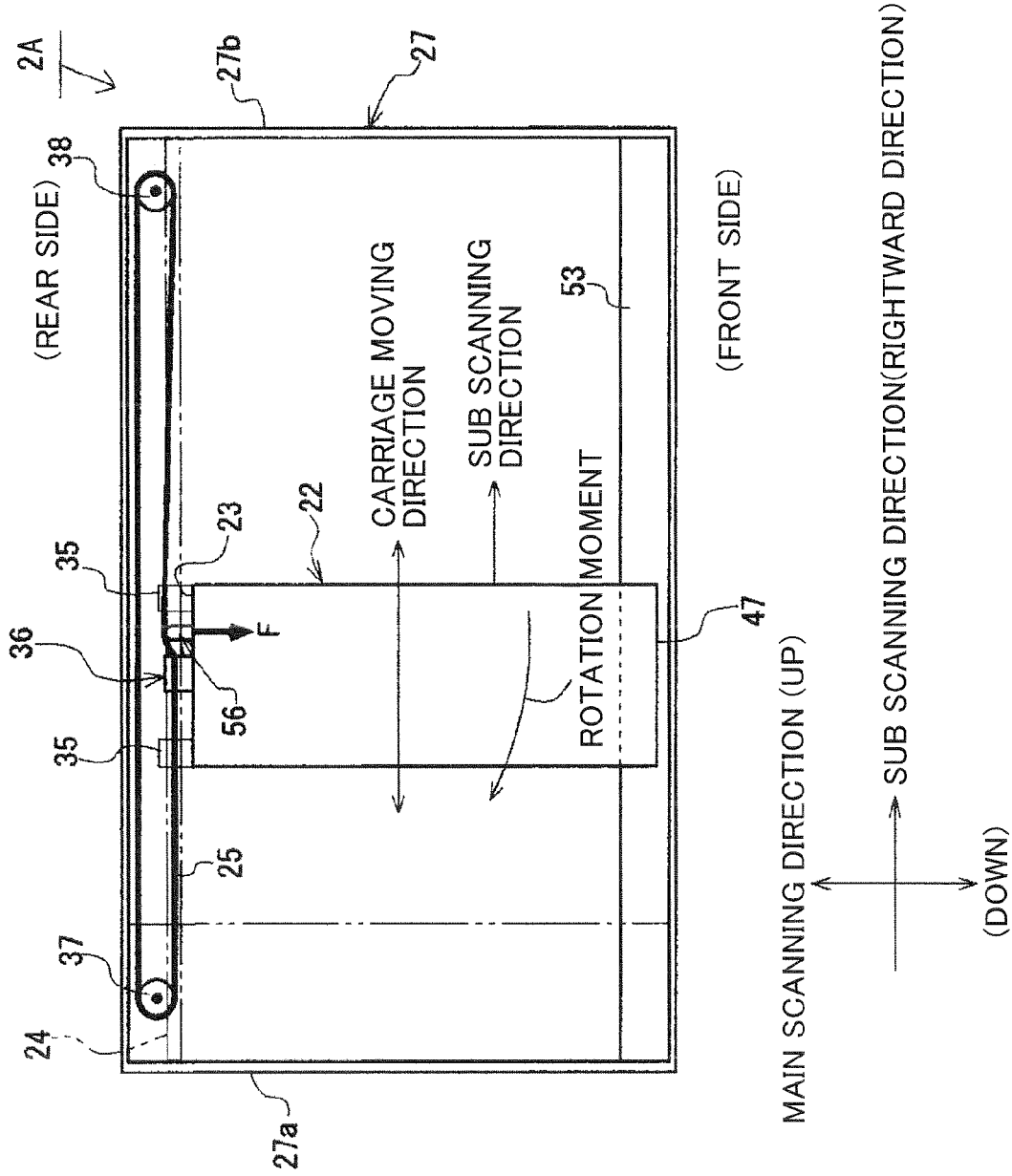
FIG. 8 is a plan view diagrammatically showing a second embodiment of an image reading apparatus.

FIG. 8 is a plan view diagrammatically showing an image reading apparatus 2A according to a second embodiment. The same constituent parts of this image reading apparatus 2A as the image reading apparatus 2 according to the first embodiment shown in FIG. 2 are identified by the same reference numerals and not repeatedly described.

In the image reading apparatus 2A, a claw portion 56 is formed to project at one end portion 23 of a carriage 22 in a main scanning direction. The claw portion 56 is arranged at a position between a bearing 35 located at a front side (right side) of a belt holding portion 36 in a sub scanning direction and the belt holding portion 36 and includes a pressing portion (upper part of the claw portion 56 in FIG. 8) held in contact with a driving belt 25 at a position (pressing position) displaced more outwardly (upwardly in FIG. 8) in the main scanning direction than the position where the driving belt 25 is held by the belt holding portion 36.

This claw portion 56 causes the driving belt 25 to project outwardly in the main scanning direction (to be pushed in) by means of the pressing portion thereof, thereby producing a force F acting inwardly in the main scanning direction in the driving belt 25. As a result, the inner circumferential surfaces of a pair of bearings 35 of the carriage 22 are pressed against a guide rail 24 with the force F produced in the driving belt 25. Further, the claw portion 56 can cause a rotation moment in a clockwise direction of FIG. 8 to act on the carriage 22 using a tensile force of the driving belt 25 by pushing the driving belt 25 outwardly in the main scanning direction. In other words, if the driving belt 25 is pushed in by the claw portion 56, such a rotation moment as to bias the one end portion 23 of the carriage 22 in the sub scanning direction (first direction) and bias the other end portion 47 of the carriage 22 in a direction (second direction) opposite to the sub scanning direction acts on the carriage 22.

According to the image reading apparatus 2A of the second embodiment as described above, the inner circumferential surfaces of the pair of bearings 35 come into close contact with the guide rail 24 due to the tensile force of the driving belt 25 and the carriage 22 smoothly slides along the guide rail 24 without shaking. Further, according to the image reading apparatus 2A, even if vibration or a variation of sliding resistance is produced when the carriage 22 moves, a rotation moment is produced to rotationally bias the carriage 22 in one direction by the tensile force of the driving belt 25. Thus, the posture of the carriage 22 is stable without causing the carriage 22 to make swinging movements. Therefore, the image reading apparatus 2A can accurately read an image of a document G similar to the image reading apparatus 2 of the first embodiment.

Further, the image reading apparatus 2A can prevent the occurrence of swinging movements of the carriage 22 only by pushing the driving belt 25 outwardly in the main scanning direction using the claw portion 56 formed on the carriage 22. Thus, it is not necessary to mount a separate part for preventing swinging movements of the carriage 22 (no increase in the number of parts) and complicate the apparatus structure, wherefore there is no product price escalation.

Furthermore, in an image forming apparatus 1 including the image reading apparatus 2A of the second embodiment, a printer assembly 3 can accurately print a recording material S based on accurately read image data.

Third Embodiment of the Image Reading Apparatus

Figure 10A:
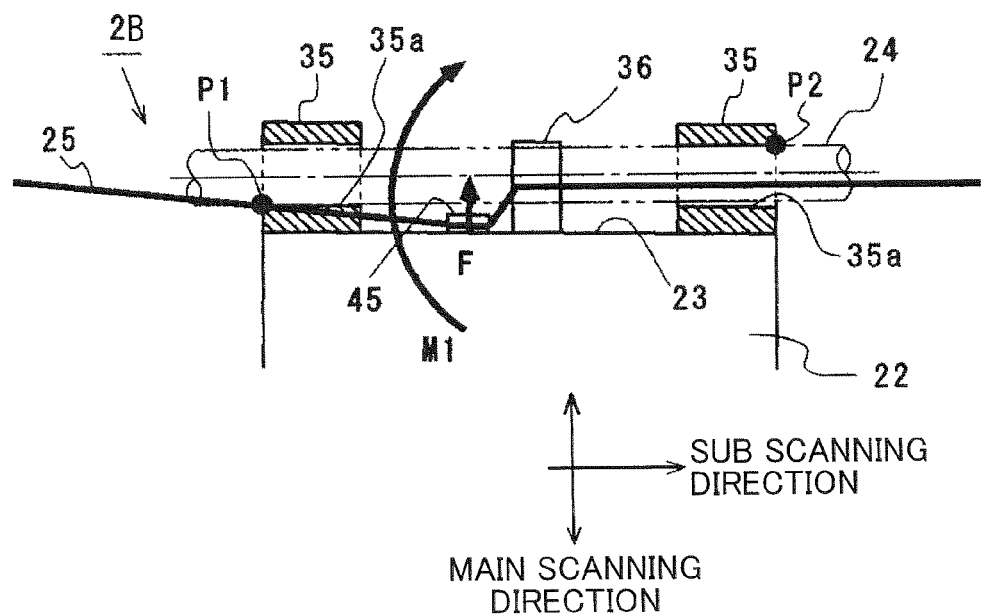
FIG. 10A is a diagram showing one end portion of a carriage of a third embodiment of an image reading apparatus and FIG. 10B is a diagram showing a modification of FIG. 10A.

FIG. 10A is a diagram of an image reading apparatus 2B according to a third embodiment diagrammatically showing one end portion 23 of a carriage 22. The same constituent parts of this image reading apparatus 2B as the image reading apparatus 2 according to the first embodiment are identified by the same reference numerals and not repeatedly described.

The image reading apparatus 2B according to the third embodiment assumes that a guide rail 24 and bearings 35 are engaged with specified clearances formed therebetween. Small clearances are provided between the outer circumferential surface of the guide rail 24 and inner circumferential surfaces 35a of the bearings 35. These clearances are fitting clearances enabling the carriage 22 to slide relative to the guide rail 24 and are, for example, clearances of about 0.03 to 0.11 mm. The carriage 22 of the image reading apparatus 2B is so inclined as to rotate in the same direction as an acting direction of a rotation moment M1 by as much as the above clearances and supports a force F resulting from a tensile force of a driving belt 25 and the rotation moment M1 at contact points P1, P2 of the guide rail 24 and the inner circumferential surfaces 35a of the pair of bearings 35.

In this way, the image reading apparatus 2B is constructed such that the inner circumferential surfaces 35a of the pair of bearings 35 come into point contact with the guide rail 24 at the contact points P1, P2 and the carriage 22 is pressed against the guide rail 24 by the force F resulting from the tensile force of the driving belt 25 and the rotation moment M1. Accordingly, the backlash of the bearings 35 of the carriage 22 and the guide rail 24 is prevented and the occurrence of swinging movements of the carriage 22 is prevented.

The image reading apparatus 2B according to the third embodiment and the image reading apparatus 2 according to the first embodiment differ from each other in that the inner circumferential surfaces 35a of the pair of bearings 35 respectively come into point contact with the guide rail 24 at the contact points P1, P2 in the image reading apparatus 2B as shown in FIG. 10A, whereas the generatrices of the inner circumferential surfaces 35a of the pair of bearings 35 and that of the outer circumferential surface of the guide rail 24 are in line contact in the image reading apparatus 2 as shown in FIG. 9. However, the both image reading apparatuses are common in that the carriage 22 is pressed against the guide rail 24 by the force F resulting from the tensile force of the driving belt 25 and the rotation moment M1 to prevent the backlash of the bearings 35 of the carriage 22 and the guide rail 24 and prevent the occurrence of swinging movements of the carriage 22. Therefore, the image reading apparatus 2B according to the third embodiment can obtain effects similar to those of the image reading apparatus 2 according to the first embodiment.

Since the carriage 22 is held in such a posture that the carriage 22 is inclined by as much as the clearances between the inner circumferential surfaces 35a of the bearings 35 and the guide rail 24 in the image reading apparatus 2B as described above, image data read by an optical unit 30 accommodated in the carriage 22 is distorted by an angle of inclination of the carriage 22 (see FIG. 3). Accordingly, the image reading apparatus 2B includes an image data correcting device (not shown) so as to be able to correct the image data read by the optical unit 30 according to the angle of inclination of the carriage 22.

Similar to the first embodiment, the image reading apparatus 2A according to the second embodiment is such that the generatrices of the inner circumferential surfaces of the pair of bearings 35 and that of the outer circumferential surface of the guide rail 24 are in line contact. The both image reading apparatuses are similar in that the carriage 22 is pressed against the guide rail 24 by the force F resulting from the tensile force of the driving belt 25 and the rotation moment M1 to prevent the backlash of the bearings 35 of the carriage 22 and the guide rail 24 and prevent the occurrence of swinging movements of the carriage 22.

Figure 10B:
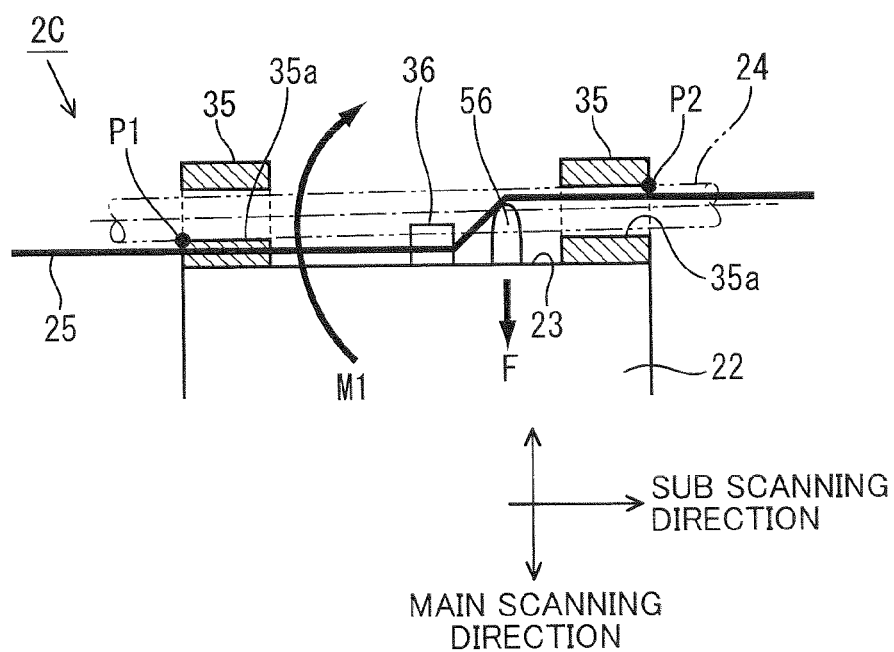

Accordingly, if the guide rail 24 and the bearings 35 are engaged with specified clearances formed therebetween in the image reading apparatus 2A according to the second embodiment, a construction similar to the third embodiment can be realized. FIG. 10B shows an image reading apparatus 2C including such clearances.

Similar to the image reading apparatus 2B of FIG. 10A, the image reading apparatus 2C is such that a carriage 22 is so inclined as to rotate in the same direction as an acting direction of a rotation moment M1 by as much as small clearances (fitting clearances) between the guide rail 24 and the inner circumferential surfaces 35a of the pair of bearings 35. Thus, a force F resulting from a tensile force of the driving belt 25 and the rotation moment M1 are supported at contact points P1, P2 of the guide rail 24 and the inner circumferential surfaces 35a of the pair of bearings 35. Effects of the image reading apparatus 2C are the same as those of the image reading apparatus 2B.

Fourth Embodiment of the Image Reading Apparatus

Figure 11A:
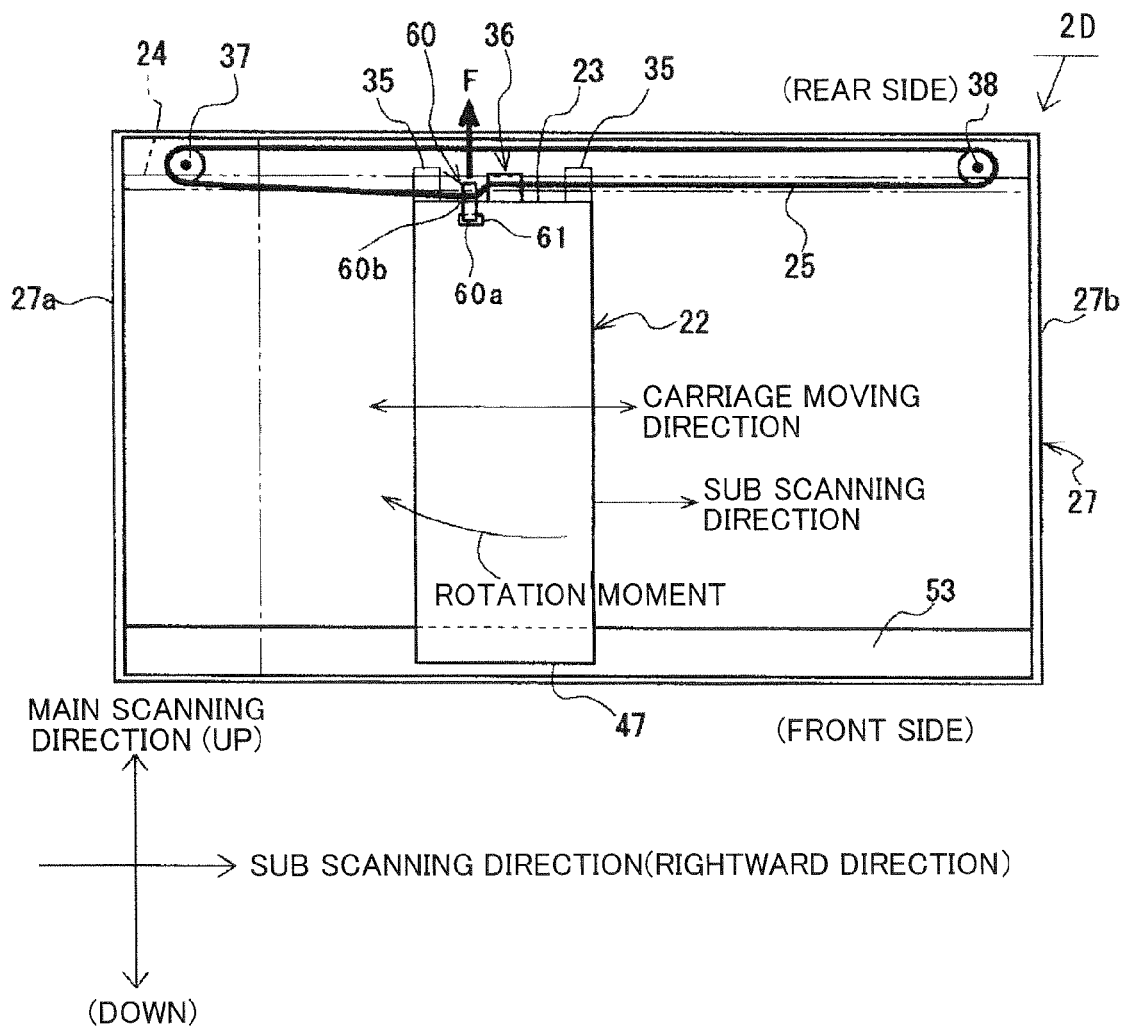
FIG. 11A is a plan view diagrammatically showing a fourth embodiment of an image reading apparatus and FIG. 11B is a diagram showing a modification of FIG. 11A.

FIG. 11A is a plan view diagrammatically showing an image reading apparatus 2D according to a fourth embodiment. The same constituent parts of this image reading apparatus 2D as the image reading apparatus 2 according to the first embodiment shown in FIG. 2 are identified by the same reference numerals and not repeatedly described.

The image reading apparatus 2D includes a claw portion 60 mounted on a driving belt 25. The claw portion 60 includes a mounting portion 60b to be slidably mounted on the driving belt 25 and a leading end part 60a (hooking portion) extending from this mounting portion 60b. The leading end part 60a of the claw portion 60 is hooked onto a claw-portion mounting part 61 provided on a carriage 22.

By this hook engagement, the mounting portion 60b of the claw portion 60 at the side toward the driving belt 25 is located more inwardly than a belt holding portion 36 in a main scanning direction. Here, the claw-portion mounting part 61 is arranged on one end portion 23 of the carriage 22 between a bearing 35 rearward (second direction) of the belt holding portion 36 in a sub scanning direction and the belt holding portion 36 and more inwardly than the belt holding portion 36 in the main scanning direction.

As a result, in the image reading apparatus 2D, a force for pressing the inner circumferential surfaces of the bearings 35 of the carriage 22 against the guide rail 24 is produced due to a tensile force of the driving belt 25. In response to this, such a rotation moment as to bias the one end portion 23 of the carriage 22 in the sub scanning direction (first direction) and bias the other end portion 47 of the carriage 22 in a direction (second direction) opposite to the sub scanning direction is produced due to the tensile force of the driving belt 25. Accordingly, also by the construction of the image reading apparatus 2D, effects similar to those of the image reading apparatus 2 of the first embodiment can be obtained.

Figure 11B:
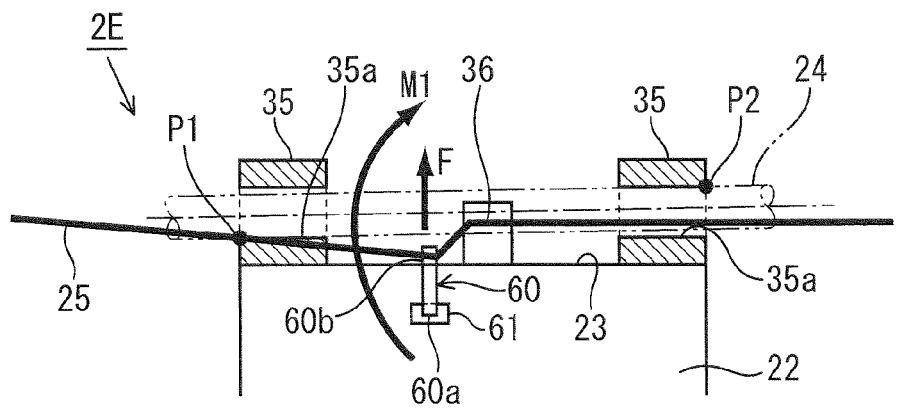

Further, if the guide rail 24 and the bearings 35 are engaged with specified clearances formed therebetween in the image reading apparatus 2D, a construction similar to the third embodiment can be realized. FIG. 11B shows an image reading apparatus 2E including such clearances.

The image reading apparatus 2E is such that a carriage 22 is so inclined as to rotate in the same direction as an acting direction of a rotation moment M1 by as much as small clearances (fitting clearances) between a guide rail 24 and inner circumferential surfaces 35a of bearings 35. Thus, a force F resulting from a tensile force of a driving belt 25 and the rotation moment M1 are supported at contact points P1, P2 of the guide rail 24 and the inner circumferential surfaces 35a of the pair of bearings 35. Effects of the image reading apparatus 2E are the same as those of the image reading apparatus 2B of the third embodiment.

Fifth Embodiment of the Image Reading Apparatus

Figure 12A:
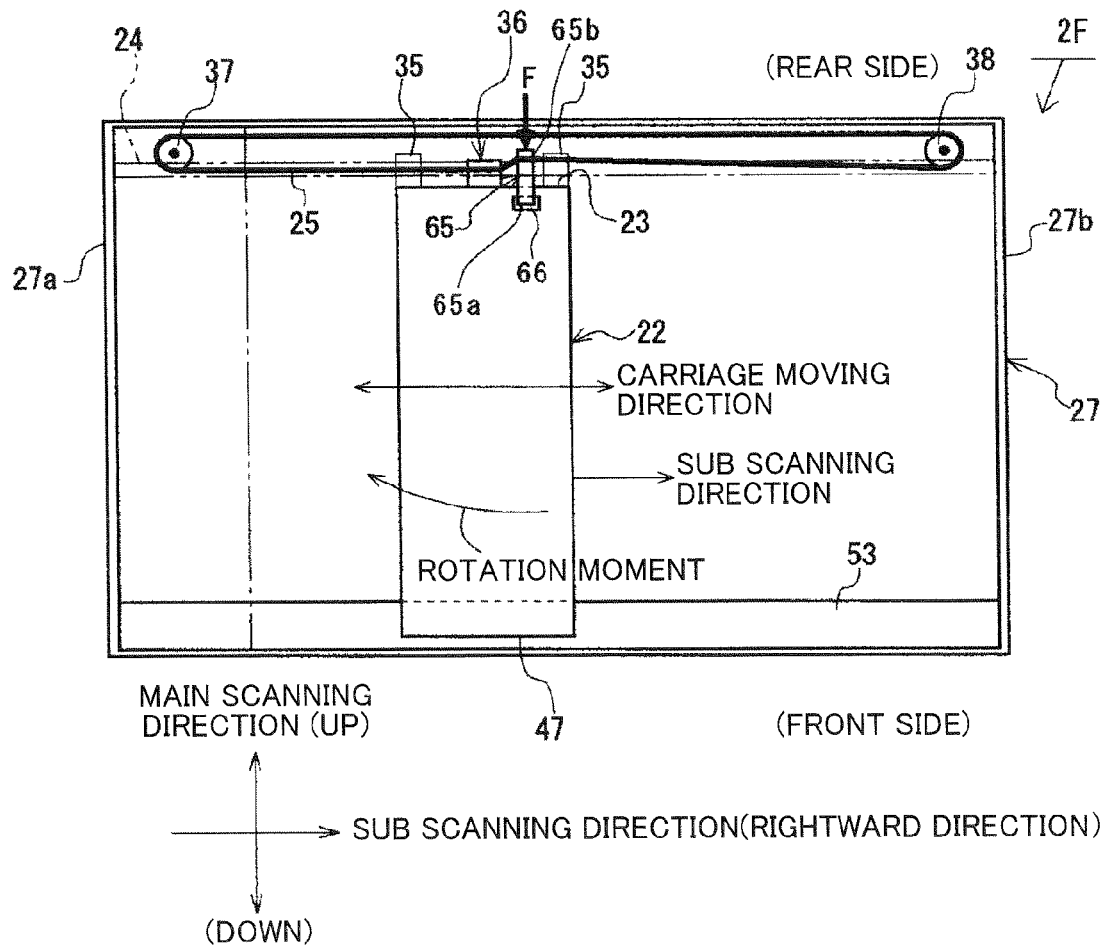
FIG. 12A is a plan view diagrammatically showing a fifth embodiment of an image reading apparatus and FIG. 12B is a diagram showing a modification of FIG. 12A.

FIG. 12A is a plan view diagrammatically showing an image reading apparatus 2F according to a fifth embodiment. The same constituent parts of this image reading apparatus 2F as the image reading apparatus 2A according to the second embodiment shown in FIG. 8 are identified by the same reference numerals and not repeatedly described.

The image reading apparatus 2F includes a claw portion 65 mounted on a driving belt 25. The claw portion 65 includes a mounting portion 65b to be slidably mounted on the driving belt 25 and a leading end part 65a (hooking portion) extending from this mounting portion 65b. The leading end part 65a of the claw portion 65 is hooked onto a claw-portion mounting part 66 provided on a carriage 22.

By this hook engagement, the mounting portion 65b of the claw portion 65 at the side toward the driving belt 25 is located more outwardly than a belt holding portion 36 in a main scanning direction. Here, the claw-portion mounting part 66 is arranged on one end portion 23 of the carriage 22 between a bearing 35 forward (first direction) of the belt holding portion 36 in a sub scanning direction and the belt holding portion 36.

As a result, in the image reading apparatus 2F, a force for pressing the inner circumferential surfaces of the bearings 35 of the carriage 22 against the guide rail 24 are produced due to a tensile force of the driving belt 25. In response to this, such a rotation moment as to bias the one end portion 23 of the carriage 22 in the sub scanning direction (first direction) and bias the other end portion 47 of the carriage 22 in a direction (second direction) opposite to the sub scanning direction is produced due to the tensile force of the driving belt 25. Accordingly, also by the construction of the image reading apparatus 2F, effects similar to those of the image reading apparatus 2A of the second embodiment can be obtained.

Figure 12B:
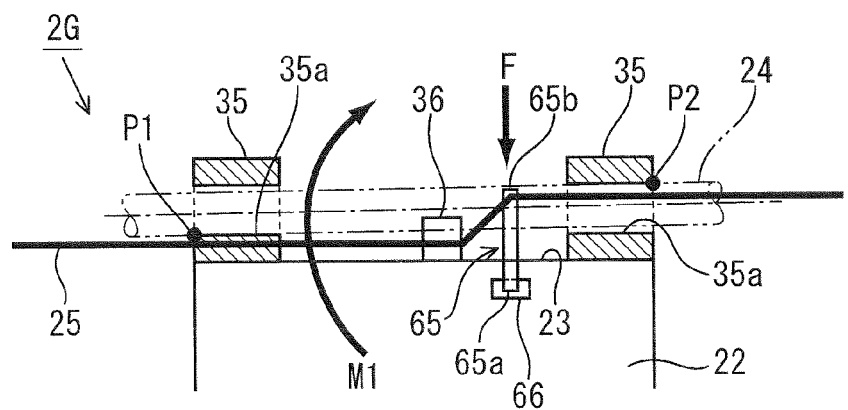

Further, if the guide rail 24 and the bearings 35 are engaged with specified clearances formed therebetween in the image reading apparatus 2F, a construction similar to the third embodiment can be realized. FIG. 12B shows an image reading apparatus 2G including such clearances.

The image reading apparatus 2G is such that a carriage 22 is so inclined as to rotate in the same direction as an acting direction of a rotation moment M1 by as much as small clearances (fitting clearances) between a guide rail 24 and inner circumferential surfaces 35a of bearings 35. Thus, a force F resulting from a tensile force of a driving belt 25 and the rotation moment M1 are supported at contact points P1, P2 of the guide rail 24 and the inner circumferential surfaces 35a of the pair of bearings 35. Effects of the image reading apparatus 2G are similar to those of the image reading apparatus 2C shown in FIG. 10B.

(Other Modifications)

In the above embodiments, the endless toothed belt is illustrated as an example of the driving member of the present invention. The driving member is not limited to this and may be, for example, a rope-like driving member such as a wire rope.

The optical unit 30 accommodated in the carriage 22 in the image reading apparatus 2 (2A to 2G) according to the present invention may not be limited to the CCD type, but may be of the CIS type.

In the image reading apparatus 2 (2A to 2G), the arrangement and number of the light source 31, the mirrors 32, the lens 33 and the CCD 34 of the optical unit 30 accommodated in the carriage 22 are not limited to the mode shown in FIG. 3 and may be appropriately changed according to design conditions and the like.

Further, the optical unit 30 accommodated in the carriage 22 is not limited to the mode shown in FIG. 3. As long as the optical unit 30 can accurately read an image of a document G, the light source 31 and the mirrors 32 may be accommodated in the carriage 22 and the lens 33 and the CCD 34 may be arranged outside the carriage 22, but in the frame body 27.

The image reading apparatus 2 (2A to 2G) may be used as a scanner to be connected to an external apparatus (e.g. computer).

In the image reading apparatus 2 (2A to 2G), the guide rail 24 may be a bar-like member having a polygonal cross section such as a rectangular bar or a plate-like member. However, the guide-rail engaging portions 35 need to be slidably engaged with the guide rail 24 and enable the carriage 22 to smoothly move along the guide rail 24.

In the image reading apparatuses 2, 2A according to the first and second embodiments, the claw portions 45, 46 are not limited to the mode formed integral to the frame body 27 of the carriage 22 (e.g. by injection molding). The claw portion 45, 46 may be formed separately from the carriage 22 and engaged with or fixed to a claw-portion mounting part (not shown) of the carriage 22. By doing so, it is possible to minimize an increase in the number of parts, prevent the structure from getting more complicated and prevent a product price escalation.

The image reading apparatus 2 (2A to 2G) is not limit to such a mode that the guide rail 24 and the driving belt 25 are arranged at the rear side and the guide plate 53 is arranged at the front side as shown in FIG. 2. A mode in which the guide rail 24 and the driving belt 25 are arranged at the front side and the guide plate 53 is arranged at the rear side is also applicable.

As described above, according to the image reading apparatus of the present invention, the backlash of the guide rail and the guide-rail engaging portions are prevented by the tensile force of the driving belt (driving member) and the posture of the carriage is held by the rotation moment resulting from the tensile force of the driving belt, whereby the occurrence of swinging movements of the carriage can be prevented. Therefore, there is no likelihood of complicating the apparatus structure and leading to a product price escalation.

Further, there can be suppressed a change of sliding resistance (variation of sliding resistance) acting during the movement of the carriage due to a sliding contact of the sliding member of the carriage with the guide plate when the carriage moves.

Furthermore, according to the image forming apparatus of the present invention, the printer assembly can accurately print a recording material based on image data accurately read by the above image reading apparatus.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

This application is based on Japanese Patent Application Serial No. 2008-300402, filed in Japan Patent Office on Nov. 26, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image reading apparatus for optically reading a document, comprising:
   a carriage including a first end portion and a second end portion facing each other in a main scanning direction of the document and accommodating an optical unit for image reading,
   a driving member mounted on a plurality of pulleys for moving the carriage in a sub scanning direction orthogonal to the main scanning direction of the document;
   a guide rail extending in the sub scanning direction;
   a guide-rail engaging portion provided on the first end portion of the carriage and engaged with the guide rail;
   a holding portion provided on the first end portion of the carriage for holding the driving member;
   a guide plate for supporting the carriage by being held in sliding contact with the lower surface of the second end portion of the carriage and guiding a movement of the carriage in the sub scanning direction; and
   a claw portion for pressing the guide-rail engaging portion against the guide rail by partially deforming the driving member to produce a tensile force in the driving member and causing the tensile force to act on the first end portion of the carriage, and producing such a rotation moment for biasing the first end portion of the carriage in a first direction parallel with the sub scanning direction and, on the other hand, biasing the second end portion of the carriage in a second direction opposite to the first direction and parallel with the sub scanning direction.

2. An image reading apparatus according to claim 1, wherein:
the claw portion is a claw portion provided on the first end portion of the carriage to be hooked onto the driving member;
the claw portion is arranged at an engaging position displaced from the holding portion in the second direction parallel with the sub scanning direction and displaced inwardly from the holding portion in the main scanning direction; and
the action of the tensile force is to pull the carriage in the main scanning direction by the tensile force of the driving member with the claw portion hooked onto the driving member.

3. An image reading apparatus according to claim 2, wherein:
the guide-rail engaging portion is engaged with the guide rail with a specified clearance formed therebetween; and
the carriage is held in such a posture inclined to rotate in the same direction as an action direction of the rotation moment by as much as the clearance between the guide rail and the guide-rail engaging portion by the action of the tensile force of the driving member and the rotation moment.

4. An image reading apparatus according to claim 2, wherein the claw portion is a member projecting from the first end portion of the carriage and formed with a groove, into which the driving member is insertable at the engaging position.

5. An image reading apparatus according to claim 1, wherein:
the claw portion is a claw portion provided on the first end portion of the carriage to be pressed against the driving member and includes a pressing portion to be pressed against the driving member at a pressing position displaced from the holding portion in the first direction parallel with the sub scanning direction and displaced outwardly from the holding portion in the main scanning direction; and
the action of the tensile force is to pull the carriage in the main scanning direction by the tensile force of the driving member with the driving member pressed by the pressing portion of the claw portion.

6. An image reading apparatus according to claim 5, wherein:
the guide-rail engaging portion is engaged with the guide rail with a specified clearance formed therebetween; and
the carriage is held in such a posture inclined to rotate in the same direction as an action direction of the rotation moment by as much as the clearance between the guide rail and the guide-rail engaging portion by the action of the tensile force of the driving member and the rotation moment.

7. An image reading apparatus according to claim 1, wherein:
the claw portion includes a mounting portion to be slidably mounted on the driving member and a hooking portion extending from the mounting portion;
a claw-portion mounting portion, onto which the hooking portion of the claw portion is to be hooked, is provided on the first end portion of the carriage and arranged at an engaging position displaced from the holding portion in the second direction parallel with the sub scanning direction and displaced inwardly from the holding portion in the main scanning direction; and
the action of the tensile force is to pull the carriage in the main scanning direction by the tensile force of the driving member by hooking the hooking portion of the claw portion onto the claw-portion mounting portion to locate the mounting portion of the claw portion inwardly from the holding portion in the main scanning direction.

8. An image reading apparatus according to claim 7, wherein:
the guide-rail engaging portion is engaged with the guide rail with a specified clearance formed therebetween; and
the carriage is held in such a posture inclined to rotate in the same direction as an action direction of the rotation moment by as much as the clearance between the guide rail and the guide-rail engaging portion by the action of the tensile force of the driving member and the rotation moment.

9. An image reading apparatus according to claim 1, wherein:
the claw portion includes a mounting portion to be slidably mounted on the driving member and a hooking portion extending from the mounting portion;
a claw-portion mounting portion, onto which the hooking portion of the claw portion is to be hooked, is provided on the first end portion of the carriage and arranged at a position displaced from the holding portion in the first direction parallel with the sub scanning direction; and
the action of the tensile force is to pull the carriage in the main scanning direction by the tensile force of the driving member by hooking the hooking portion of the claw portion onto the claw-portion mounting portion to locate the mounting portion of the claw portion outwardly from the holding portion in the main scanning direction.

10. An image reading apparatus according to claim 9, wherein:
the guide-rail engaging portion is engaged with the guide rail with a specified clearance formed therebetween; and
the carriage is held in such a posture inclined to rotate in the same direction as an action direction of the rotation moment by as much as the clearance between the guide rail and the guide-rail engaging portion by the action of the tensile force of the driving member and the rotation moment.

11. An image reading apparatus according to claim 1, further comprising a sliding member arranged in a part of the second end portion of the carriage which comes into contact with the guide plate and having a lower frictional coefficient than the carriage and the guide plate.

12. An image reading apparatus according to claim 1, further comprising a transparent plate having a first surface, on which the document is to be placed, and a second surface facing the first surface, wherein the optical unit of the carriage is arranged closer to the second surface of the transparent plate.

13. An image forming apparatus, comprising:
an image reading apparatus for optically reading a document; and
an image forming unit for forming an image on a recording material based on image data read by the image reading apparatus,
wherein the image reading apparatus includes:
a carriage including a first end portion and a second end portion facing each other in a main scanning direction of the document and accommodating an optical unit for image reading,
a driving member mounted on a plurality of pulleys for moving the carriage in a sub scanning direction orthogonal to the main scanning direction of the document;
a guide rail extending in the sub scanning direction;

a guide-rail engaging portion provided on the first end portion of the carriage and engaged with the guide rail;

a holding portion provided on the first end portion of the carriage for holding the driving member;

a guide plate for supporting the carriage by being held in sliding contact with the lower surface of the second end portion of the carriage and guiding a movement of the carriage in the sub scanning direction; and a claw portion for pressing the guide-rail engaging portion against the guide rail by partially deforming the driving member to produce a tensile force in the driving member and causing the tensile force to act on the first end portion of the carriage, and producing such a rotation moment for biasing the first end portion of the carriage in a first direction parallel with the sub scanning direction and, on the other hand, biasing the second end portion of the carriage in a second direction opposite to the first direction and parallel with the sub scanning direction.

* * * * *